United States Patent Office 2,716,111
Patented Aug. 23, 1955

2,716,111

POLYMERIZATION OF VINYL CHLORIDE WITH A BENZENESULFONYL CHLORIDE MODIFIER

Dexter C. Seymour, Wyckoff, N. J., assignor to United States Rubber Company, New York, N. Y., a corporation of New Jersey No Drawing. Application November 26, 1952, Serial No. 322,806

16 Claims. (Cl. 260—92.8)

This invention relates to the polymerization of vinyl chloride, and more particularly to the production of polyvinyl chloride of lower molecular weight.

Polyvinyl chloride resins enjoy a reputation for toughness and durability. One of the principal difficulties in adapting these resins for many applications resides in their high softening temperature. For example, if it is desired to mill polyvinyl chloride into thin sheets, the milling temperatures necessary are quite high, i. e., from 300° F. to 340° F. These high temperatures increase the difficulties in processing the resins. A further difficulty encountered during high temperature processing of polyvinyl chloride is a tendency of the resin to decompose. Various stabilizers, e. g., zinc stearate, cadmium stearate, alkyl tin compounds, are commonly added to the polyvinyl chloride to prevent thermal decomposition, but these compounds are effective in retarding decomposition for only a limited time at the temperatures employed. Another undesirable characteristic of polyvinyl chloride resins is their low solubility in readily available solvents. These disadvantages may be overcome by producing polyvinyl chloride of lower molecular weight.

I have discovered that when vinyl chloride is polymerized in the presence of a small amount of benzenesulfonyl chloride or its monomethyl or monobromo derivatives, the molecular weight of the resultant polyvinyl chloride is lower than in polymerization without the benzenesulfonyl chloride. The benzenesulfonyl chloride or its methyl or bromo derivative acts as a molecular weight modifier or regulator, and the molecular weight of the resultant polyvinyl chloride is lower, the higher the amount of the benzenesulfonyl chloride employed. Further, the average molecular weight of the polymer remains essentially constant over the whole course of the polymerization. Thus, a polyvinyl chloride of any desired average molecular weight and with uniform properties may be prepared simply by adjusting the amount of regulator added to the vinyl chloride reaction mixture.

The range of benzenesulfonyl chloride or its methyl or bromo derivative used in the present invention may be from 0.1 to 8% based on the vinyl chloride monomer depending on the molecular weight of the polyvinyl chloride desired. Generally not more than 6% of benzenesulfonyl chloride or its methyl or bromo derivative will be used. All parts and percentages referred to herein are by weight.

The benzenesulfonyl chloride or its methyl or bromo derivative may be used as a molecular weight regulator for vinyl chloride in the various conventional methods of polymerization, viz. bulk or mass or so-called oil-phase polymerization of the liquefied vinyl chloride; solution polymerization where the vinyl chloride is dissolved in a solvent; suspension or bead or granular polymerization where the vinyl chloride is suspended in the form of large droplets and agitated in an aqueous medium generally containing a non-emulsifying suspending agent such as protein or gum; and emulsion polymerization where the vinyl chloride is emulsified in water by means of a surface-active emulsifying agent. Details of these methods of polymerization generally are found in "Unit Processes in Organic Synthesis" by P. H. Groggins, Third Edition, pages 847 to 858 (published by McGraw Hill Book Company, Inc., New York, 1947), and details of the methods of polymerization specifically directed to vinyl chloride are found in "Vinyl and Related Polymers" by C. E. Schildknecht, pages 392–398 (published by John Wiley & Sons, Inc., New York, 1952). The regulator of the present invention, as suggested above, is preferably added to the monomer charge before initiation of polymerization in order to obtain the most uniform properties of the polyvinyl chloride product of the polymerization, but, if desired, the vinyl chloride polymerization may be initiated and partially carried out in the absence of the regulator to give a conventional high molecular weight to the polymer thus formed in the first part of the polymerization, and thereafter the regulator may be added to the partially polymerized reaction mixture to give a lower molecular weight to that portion of the polyvinyl chloride formed later in the presence of the regulator of the present invention.

The polymerization reaction is carried out at 25° C. to 60° C. in the presence of a conventional free radical type polymerization initiator, such as a peroxygen or azo catalyst. Examples of peroxygen catalysts are inorganic peroxides, e. g., hydrogen peroxide and persalts, such as alkali persulfates, alkali perborates, alkali percarbonates; and organic peroxides, e. g., diacetyl peroxide, dibenzoyl peroxide, acetyl benzoyl peroxide, lauroyl peroxide, cumene hydroperoxide, tertiary butyl hydroperoxide. Examples of azo catalysts are alpha, alpha'-azobisisobutyronitrile, and p-methoxybenzene diazo thio-2-naphthyl ether. Catalytic amounts from 0.05% to 2% based on the vinyl chloride monomer may be used.

In the following examples which illustrate the invention, differences in molecular weight of various vinyl chloride polymers are shown by differences in the intrinsic viscosities of the polymers, the lower the molecular weight, the lower will be the intrinsic viscosity. The intrinsic viscosities in the examples were obtained from viscosity measurements at 30° C. of cyclohexanone solutions of the vinyl chloride polymers and of the cyclohexanone solvent. The intrinsic viscosity $[\eta]$ is defined by the equation:

$$[\eta] = \lim_{c \to 0} \left( \frac{\ln \eta_{rel}}{c} \right)$$

where $\eta_{rel}$ is relative viscosity (i. e. viscosity of the solution of polymer relative to that of the solvent), and $c$ is concentration of polymer in grams per 100 cc., the concentration selected being such that $\eta_{rel}$ has a value of from 1.15 to 1.4. Intrinsic viscosity may also be defined by the equation:

$$[\eta] = \lim_{c \to 0} \left( \frac{\eta_{sp}}{c} \right)$$

where $\eta_{sp}$ is specific viscosity, and $\eta_{sp} = \eta_{rel} - 1$, and $\eta_{rel}$ and $c$ are as in the formula first above.

EXAMPLE I

Into each of a series of five pressure tubes was weighed 0.53 g. of alpha, alpha'-azobisisobutyronitrile. The tubes were cooled to Dry Ice temperature (−77° C.) and into each of four of them was placed 0.3 g. of benzenesulfonyl chloride (1.5% of the weight of vinyl chloride to be taken). The fifth tube served as a control. The tubes were then sealed to the vacuum line, the pressure therein was lowered to less than $10^{-4}$ mm., and 19.9 g. of liquid vinyl chloride was distilled into each. After being frozen in liquid nitrogen, the tubes were sealed off and each tube was heated at 30° C. for a different length of time so as to get a different extent of conversion of monomer to polymer from tube to tube.

After the heating step the unreacted vinyl chloride in each tube was measured and the conversion of monomer to polymer was calculated. The polymer in each tube was then isolated and washed several times with methanol and its intrinsic viscosity measured. The data are summarized in Table I:

*Table I*

| Tube No. | Control | 1 | 2 | 3 | 4 |
| --- | --- | --- | --- | --- | --- |
| Time, Hrs. | 4 | 4 | 7.5 | 10 | 12 |
| Percent Conversion | 13.2 | 9.2 | 27 | 36.7 | 41.8 |
| Intrinsic Viscosity | 1.75 | 0.92 | 0.86 | 0.85 | 0.85 |

The intrinsic viscosities in Table I clearly show that those polymers prepared in the presence of benzenesulfonyl chloride have a much lower intrinsic viscosity than the control and accordingly a lower molecular weight. Moreover, the constancy of the viscosity of the benzenesulfonyl chloride-containing polymers, regardless of the extent of conversion, illustrates that, for a given ratio of regulator to monomer, the polymer molecular weight is substantially independent of the extent of conversion to which the reaction is carried.

EXAMPLE II

In accordance with the procedure described in Example I, the polymerization of vinyl chloride was carried out in the presence of 0.3 g. of p-toluenesulfonyl chloride. As in Example I, four reactions were carried out concurrently to various degrees of conversion. The results are given in Table 2:

*Table 2*

| Tube No. | Control | 1 | 2 | 3 | 4 |
| --- | --- | --- | --- | --- | --- |
| Time, Hrs. | 4.2 | 4.2 | 7.5 | 10 | 12 |
| Percent Conversion | 17.4 | 9.6 | 19.7 | 28.2 | 37.3 |
| Intrinsic Viscosity | 2.0 | 0.9 | 0.8 | 0.9 | 0.9 |

EXAMPLE III

In accordance with the procedure described in Example I, 19.9 g. samples of vinyl chloride were polymerized for three and one-half hours, a control sample without addition of a regulator, and a sample illustrative of the invention containing 0.3 g. of p-bromobenzenesulfonyl chloride.

The intrinsic viscosity of the control polyvinylchloride was 1.8, whereas the intrinsic viscosity of the polyvinyl chloride regulated with the p-bromobenzenesulfonyl chloride was 0.37.

EXAMPLE IV

The following suspension polymerization recipe was placed in each of two cold, stainless steel bombs from which the air had been displaced by nitrogen: 100 parts of vinyl chloride, 325 parts of water, 0.37 part of gelatin, 0.2 part of lead acetate, and 0.2 part of lauroyl peroxide. To the recipe in one bomb was added one part of p-toluenesulfonyl chloride. No regulator was added to the other (control) bomb.

The bomb was then sealed and heated at 55° C. for 10 hours.

The intrinsic viscosity of the control polyvinyl chloride which was at 83% conversion was 1.02, whereas the intrinsic viscosity of the polyvinyl chloride regulated with the p-toluenesulfonyl chloride which was at 59% conversion was 0.70.

EXAMPLE V

Vinyl chloride was polymerized in aqueous emulsion using the following recipe: 50 parts of vinyl chloride, 100 parts of water, 0.1 part of disodium hydrogen phosphate, 0.5 part of surface-active emulsifying agent, and 0.05 part of potassium persulfate. In the control run, no regulator was added. In the run illustrating the invention, one part of p-toluenesulfonyl chloride was included in the polymerization recipe.

All of the constituents of the recipes except the vinyl chloride were placed in stainless steel pressure vessels and the air was displaced by nitrogen. The contents were frozen to a slush and liquid vinyl chloride was weighed in. The vessels were then closed and heated at 50° C. in a rocking device for 7.5 hours. The excess vinyl chloride was then vented and the latices were flocculated by freezing and the polymers were collected by filtration. After three washings in water and two with methanol, they were dried in vacuo.

The control polyvinyl chloride which was at 74% conversion had an intrinsic viscosity of 1.26, whereas the polyvinyl chloride polymerized in the presence of the p-toluenesulfonyl chloride which was at 51% conversion had an intrinsic viscosity of 0.86.

In view of the many changes and modifications that may be made without departing from the principles underlying the invention, reference should be made to the appended claims for an understanding of the scope of the protection afforded the invention.

Having thus described my invention what I claim and desire to protect by Letters Patent is:

1. The method which comprises polymerizing vinyl chloride at 25° C. to 60° C. in the presence of a free radical producing polymerization initiator and 0.1% to 8%, based on the weight of the vinyl chloride monomer, of material selected from the group consisting of benzenesulfonyl chloride, and its monomethyl and monobromo derivatives.

2. The method which comprises polymerizing vinyl chloride at 25° C. to 60° C. in the presence of a free radical producing polymerization initiator and 0.1% to 8%, based on the weight of the vinyl chloride monomer, of benzenesulfonyl chloride.

3. The method which comprises polymerizing vinyl chloride at 25° C. to 60° C. in the presence of a free radical producing polymerization initiator and 0.1% to 8%, based on the weight of the vinyl chloride monomer, of p-toluenesulfonyl chloride.

4. The method which comprises polymerizing vinyl chloride at 25° C. to 60° C. in the presence of a free radical producing polymerization initiator and 0.1% to 8%, based on the weight of the vinyl chloride monomer, of p-bromobenzenesulfonyl chloride.

5. The method which comprises polymerizing vinyl chloride at 25° C. to 60° C. in an aqueous medium in the presence of a free radical producing polymerization initiator and 0.1% to 8%, based on the weight of the vinyl chloride monomer, of material selected from the group consisting of benzenesulfonyl chloride, and its monomethyl and monobromo derivatives.

6. The method which comprises polymerizing vinyl chloride at 25° C. to 60° C. in an aqueous medium in the presence of a free radical producing polymerization initiator and 0.1% to 8%, based on the weight of the vinyl chloride monomer, of benzenesulfonyl chloride.

7. The method which comprises polymerizing vinyl chloride at 25° C. to 60° C. in an aqueous medium in the presence of a free radical producing polymerization initiator and 0.1% to 8%, based on the weight of the vinyl chloride monomer, of p-toluenesulfonyl chloride.

8. The method which comprises polymerizing vinyl chloride at 25° C. to 60° C. in an aqueous medium in the presence of a free radical producing polymerization initiator and 0.1% to 8%, based on the weight of the vinyl chloride monomer, of p-bromobenzenesulfonyl chloride.

9. A process for production of polyvinyl chloride latex which comprises polymerizing vinyl chloride at 25° C. to 60° C. in aqueous emulsion in the presence of a free radical producing polymerization initiator and 0.1% to 8%, based on the weight of the vinyl chloride monomer, of material selected from the group consisting of benzenesulfonyl chloride, and its monomethyl and monobromo derivatives.

10. A process for production of polyvinyl chloride latex which comprises polymerizing vinyl chloride at 25° C. to 60° C. in aqueous emulsion in the presence of a free radical producing polymerization initiator and 0.1% to 8%, based on the weight of the vinyl chloride monomer, of benzenesulfonyl chloride.

11. A process for production of polyvinyl chloride latex which comprises polymerizing vinyl chloride at 25° C. to 60° C. in aqueous emulsion in the presence of a free radical producing polymerization initiator and 0.1% to 8%, based on the weight of the vinyl chloride monomer, of p-toluenesulfonyl chloride.

12. A process for production of polyvinyl chloride latex which comprises polymerizing vinyl chloride at 25° C. to 60° C. in aqueous emulsion in the presence of a free radical producing polymerization initiator and 0.1% to 8%, based on the weight of the vinyl chloride monomer, of p-bromobenzenesulfonyl chloride.

13. A process for production of granular polyvinyl chloride which comprises polymerizing vinyl chloride at 25° to 60° C. in non-emulsified aqueous suspension in the presence of a free radical producing polymerization initiator and 0.1% to 8%, based on the weight of the vinyl chloride monomer, of material selected from the group consisting of benzenesulfonyl chloride, and its monomethyl and monobromo derivatives.

14. A process for production of granular polyvinyl chloride which comprises polymerizing vinyl chloride at 25° C. to 60° C. in non-emulsified aqueous suspension in the presence of a free radical producing polymerization initiator and 0.1% to 8%, based on the weight of the vinyl chloride monomer, of benzenesulfonyl chloride.

15. A process for production of granular polyvinyl chloride which comprises polymerizing vinyl chloride at 25° C. to 60° C. in non-emulsified aqueous suspension in the presence of a free radical producing polymerization initiator and 0.1% to 8%, based on the weight of the vinyl chloride monomer, of p-toluenesulfonyl chloride.

16. A process for production of granular polyvinyl chloride at 25° C. to 60° C. which comprises polymerizing vinyl chloride in non-emulsified aqueous suspension in the presence of a free radical producing polymerization initiator and 0.1% to 8%, based on the weight of the vinyl chloride monomer, of p-bromobenzenesulfonyl chloride.

No references cited.